Aug. 4, 1959        R. F. KRUPP ET AL        2,897,947
CURVED GUIDE RAIL FOR CONTAINER CONVEYOR TRANSFER
Filed Dec. 3, 1956

INVENTOR.
ROBERT F. KRUPP
JAN K. WAGNER
BY
Townsend and Townsend
ATTORNEYS

United States Patent Office 2,897,947
Patented Aug. 4, 1959

2,897,947

CURVED GUIDE RAIL FOR CONTAINER CONVEYOR TRANSFER

Robert F. Krupp and Jan K. Wagner, Oakland, Calif., assignors to Gerber Products Company, Fremont, Mich., a corporation of Michigan Application December 3, 1956, Serial No. 625,672

3 Claims. (Cl. 198—28)

This invention relates to new and improved guide rail for container conveyor transfer. The present invention has application to a guide rail to guide the transfer of a container from one conveyor to another, particularly when the containers are moving at relatively high speeds. Heretofore such guide rails have been disposed at an angle relative to the path of the conveyors, which angle is selected to accomplish the desired movement from one conveyor to the next, but such guide rails have been straight. Straight guide rails have been found undesirable in that the containers are not transferred smoothly and hence have a tendency to be damaged by rebounding from the guide rail.

The present invention comprises a guide rail which is curved rather than straight and which has for its principal object the smooth transfer of containers from one conveyor to the next. The curve has a radius greater than the natural parabola the container would follow by reason of the velocity of the container and the coefficient of friction between the container and the conveyor on which it is deposited. The curvature is derived by mathematical computation and empirical considerations hereinafter set forth in detail.

Accordingly the present invention has for its principal object the provision of a curved transfer guide rail against which containers are moved and which guides the containers laterally off one conveyor and onto an adjacent conveyor moving at a different speed, the rail being so curved that the containers are in engagement therewith continuously, with no tendency to bounce back from the rail.

The foregoing described smooth transfer accomplished by the curvature of the guide rail permits operation of machinery in which the rail is installed at higher speeds than heretofore has been possible. In addition, the smooth transfer prevents damage to the containers by reason of the impact and rebounding which take place in conventional conveyor construction.

Other objects of the present invention will become apparent upon reading the following specification and referring to the accompanying drawings in which similar characters of reference represent corresponding parts in each of the several views.

The present invention has application in a wide variety of machines wherein containers and the like are transferred from one moving conveyor to another by lateral movement. One such application of the invention is in a single filing machine such as that illustrated and described in our co-pending application entitled Single Filing Machine which was executed on the 25th day of May, 1956, and which comprises patent application Serial No. 591,658, filed June 15, 1956.

Figure 1:
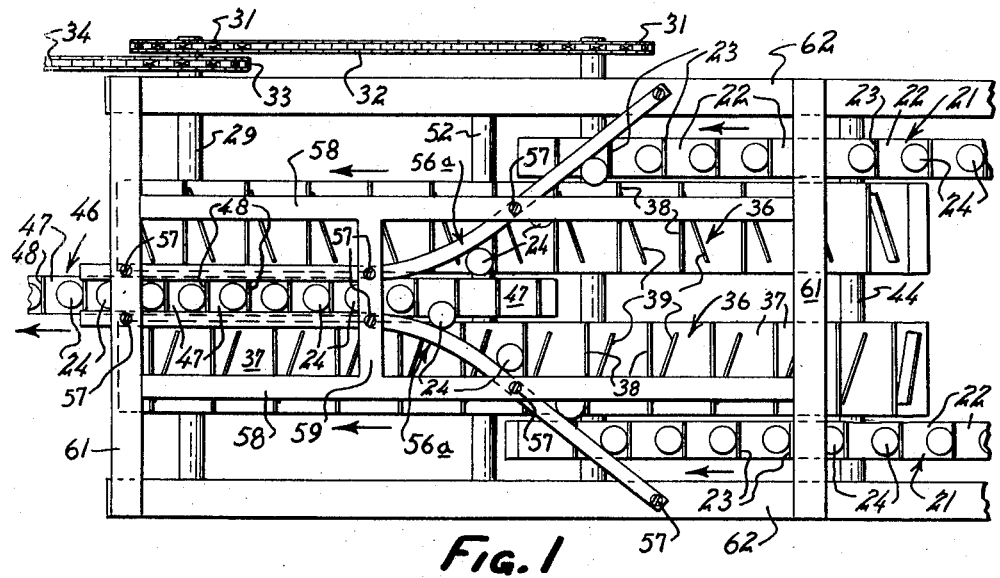
Fig. 1 is a top plan of a conveyor construction in which the present invention is installed.
Figure 2:
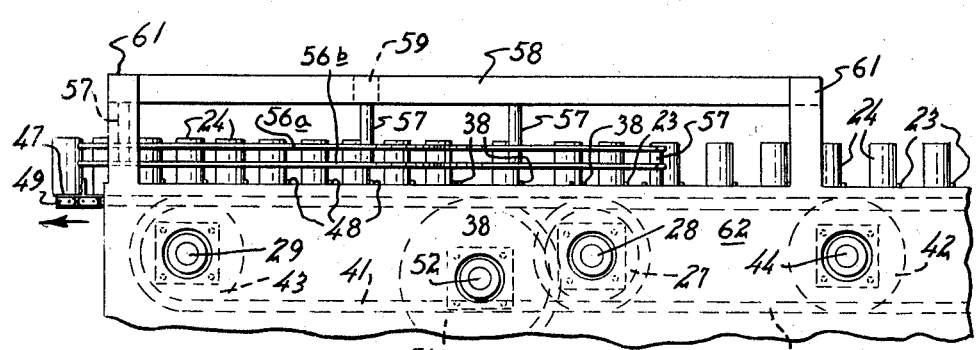
Fig. 2 is a side elevation thereof.

A portion of such machine is illustrated in Figs. 1 and 2. In such machine there is provided a pair of side conveyors 21 on either side of the machine which move from right to left, as shown in Fig. 1. Each such side conveyor 21 has in its horizontal stretch a horizontal platform 22 at the trailing edge whereof is an upstanding vertical lug 23. Thus as the conveyor advances, containers 24 are moved by lugs 23 in timed progression. Each platform 22 is attached to a link of a chain 26 which at its rearward end passes over sprocket 27 on shaft 28. Shaft 28 is in turn driven from drive shaft 29 by means of sprockets 31 and chain 32 and shaft 29 is in turn driven by sprocket 33 and chain 34 from a motor (not shown).

Disposed immediately inwardly of side conveyors 21 is a pair of relatively wide transfer conveyors 36 each comprising a plurality of platforms 37 which are horizontally disposed in the horizontal stretch of the conveyor and to the trailing edges of which are affixed upstanding vertical lugs 38. Angularly disposed guides 39 are fastened to horizontal platforms 37, guides 39 functioning to keep containers 24 in contact with lugs 38 at the time of removal of the containers from the transfer conveyors. Each transfer conveyor 36 is driven by one or more chains 41 which pass over sprockets 42 and 43 at opposite ends of the conveyor. Sprockets 42 and 43 are mounted on shafts 44 and 29, respectively, shaft 29 being the drive shaft.

The inner edges of transfer conveyors 36 are spaced apart a distance sufficient to provide room for the centrally disposed takeaway conveyor 46. Takeaway conveyor 46 moves at a higher rate of speed than the conveyors heretofore mentioned and receives containers 24 from both of the transfer conveyors 36. Takeaway conveyor 46 is similar in construction to side conveyors 21 inasmuch as in its horizontal path of travel it has platforms 47 horizontally disposed at the trailing edge of which are upstanding vertically disposed lugs 48. Takeaway conveyor 46 is driven by chain 49 which passes over a sprocket (not shown) at the rearward end of the conveyor. The forward end of chain 49 passes around sprocket 51 on idler shaft 52.

Containers 24 or other objects to be handled are deposited by means not shown, and which form no part of the present invention, on the platforms 22 of side conveyors 21 and as the conveyors advance, lugs 23 move the containers to the left until they contact top and bottom guide rails $56^a$ and $56^b$. Top and bottom guide rails $56^a$ and $56^b$ are substantially identical and vertically spaced apart so that they are approximately equidistant above and below the midpoint of the horizontal axis of containers 24, thereby resisting any tendency of the container to tip. Guide rails $56^a$ and $56^b$ are suspended by means of legs 57 from horizontally disposed longitudinal and transverse arms 58 and 59 which are in turn attached to inverted U-shaped crossovers 61 fixed to main frame members 62 of the machine.

Figure 3:
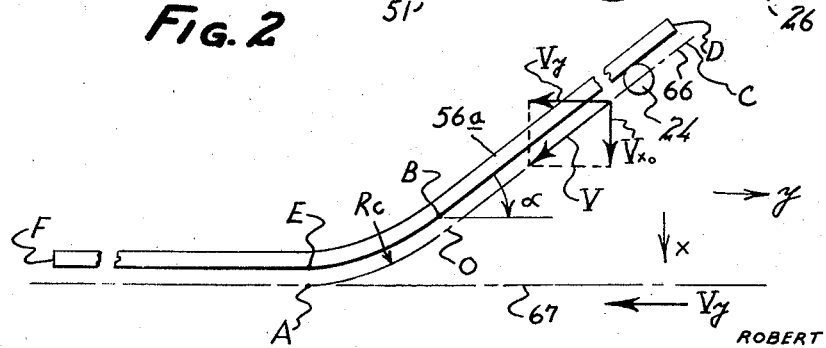
Fig. 3 is a schematic plan view showing the derivation of the curvature of the rail.

Turning now to Fig. 3, the path of the center of the containers 24 is engaged by the straight section of the guide rail as shown by center line 66. The ultimate path of the centers of the containers on takeaway conveyor 46 is shown by center line 67. The angle of the straight part of guide rail $56^a$ to the direction of movement of conveyor 36 is $\alpha$. Let it be assumed as follows:

$V_y$=const.=velocity of conveyor 36.
$V_x$=component of the velocity of jar 24 perpendicular to the conveyor velocity.
$V_{x0}$=const.=value of $V_x$ when jar moves along straight line rail $56a$ up to point.

also $V_x$=velocity of jar with respect to the conveyor.
$\mu$=friction coefficient between jar and conveyor.

$V$ = total velocity of jar.
$G$ = weight of the jar.
$m$ = mass of the jar.
$a$ = deceleration of the jar.
$g$ = acceleration of gravity.

Suppose that jar 24 is sliding along straight rail 56ª and on the conveyor. When the center of the jar reaches point 0 in $x$, $y$, coordinates, the jar loses contact with the straight rail. However, the jar is pushed by the conveyor, so its velocity component parallel to the velocity of conveyor is $V_y$ = const. However its velocity perpendicular to conveyor velocity is no longer $V_{x0}$, but $V_x$ = variable. At point 0 the jar goes over from straight line motion into curved line motion.

Absolute motion of the jar consists, then, of two components, $V_y$ and $V_x$.

$V_y$ = const. and its numerical value and direction is equal to the conveyor velocity.

$V_x$ is at right angles to the direction of motion of the conveyor and at the same time is the relative velocity of the jar with respect to the conveyor. It is variable because after the center of the jar passes point 0, the straight rail does not push the jar any longer. If we neglect the air resistance of the moving jar as very small because of small velocity of motion, the only force acting upon the jar in a horizontal direction is the friction force $P = \mu G$ between the jar and the conveyor. The direction of this force is opposite to the relative velocity $V_x$. Because of force P, velocity $V_x$ decreases to 0. If we assume as the first approximation $\mu$ = const., then $P$ = const. But $P = ma$ = deceleration of the jar in the direction of $V_x$ and $$m = \frac{G}{g}$$

so $$P = \frac{G}{g} \cdot a = \mu G$$

and $a = \mu G$ = const., which means $$\frac{d^2x}{dt^2} = -a$$

$$\frac{dx}{dt} = -at + A$$

$$x = -\frac{at^2}{2} + At + B$$

integration constants A and B:
when $$t = 0$$

(in the origin of coordinates), $$\frac{dx}{dt} = V_{x0}$$

so $$A = V_{x0}$$

when $$t = 0$$

then $$x = 0$$

so $$B = 0$$

eventually $$x = V_{x0}t - \frac{at^2}{2}$$

(Equation 1)

and $$y = V_y t \quad \text{(Equation 2)}$$

(1) and (2) are parametric equations of the path of the center of the jar beginning at 0. This path is a segment of a parabola of 2nd degree.

The construction of the rail should be such as to guide the jar so that the jar will gradually change its direction of motion until the angle between the direction of motion of the jar and the direction of motion of the conveyor come to $a = 0$. At the same time the jar should be guided all the time; i.e., it should never lose contact with the curved rail. The jar will not lose contact with the curved rail if the radius of curvature of the rail plus radius of the jar is equal or more than the largest radius of curvature of the segment of the parabola. For the curved rail, the circular segment is chosen.

Radius of curvature in general:

$$R = \frac{\left[x + \left(\frac{dy}{dx}\right)^2\right]^{3/2}}{\frac{d^2y}{dx^2}}$$

For the given parabola:

$$X = V_{x0} - \frac{at^2}{2}; \quad y = V_y t$$

so $$t = \frac{y}{V_y}$$

$$\frac{dx}{dt} = V_{x0} - at; \quad \frac{dy}{dt} = V_y$$

$$\frac{dy}{dx} = \frac{dy}{dt} \cdot \frac{dt}{dx} = V_y \cdot \frac{1}{V_{x0} - at} = \frac{1}{\frac{V_{x0}}{V_y} - \frac{a}{V_y^2}y}$$

$$\frac{dx}{dy} = \frac{V_{x0}}{V_y} - \frac{a}{V_y^2}y$$

$$\frac{d^2x}{dy^2} = -\frac{a}{V_y^2}$$

so $$R = \frac{\left[1 + \left(\frac{V_{x0}}{V_y} - \frac{a}{V_y^2}y\right)^2\right]^{3/2}}{-\frac{a}{V_y^2}}$$

$R = R_{max}$ when $y = 0$ $$R_{max} = \frac{\left[1 + \left(\frac{V_{x0}}{V_y}\right)^2\right]^{3/2}}{-\frac{a}{V_y^2}} = -\frac{\left[1 + \frac{V_{x0}^2}{V_y^2}\right]^{3/2} V_y^2}{a}$$

Hence $$R_c \geq R_{max} - r$$

and then $$R_c \geq \frac{\left[1 + \frac{V_{x0}^2}{V_y^2}\right]^{3/2} V_y^2}{a} - r$$

From the foregoing formulae is derived the following practical formula for the derivation of the radius of the curve:

$$R_c \geq \frac{[1 + (\tan \alpha)^2]^{3/2} V^2}{386\mu} - r$$

wherein $\alpha$ is the angle of the guide rail 56ª with relation to the direction of the movement of the conveyors 21, 36 and 46 expressed in degrees. $R_c$ is the radius of the discharge rail between B and E in inches, $r$ is the radius of the container 24 in inches, V is the velocity of conveyor 36 in inches per second, $\mu$ is the coefficient of friction between the container and the conveyor. 386 is the acceleration of gravity in inches per second per second.

Accordingly rails 56ª and 56ᵇ comprise, in plan, a straight stretch DB extending diagonally across conveyor 21 and to the outer edge of conveyor 36 at angle $\alpha$; thence a curved stretch BE having radius $R_c$; and thence a second straight stretch EF along the outer edge of conveyor 46. Curved stretch BE is tangent to stretches DB and EF.

By constructing rails 56ª and 56ᵇ with curved sections having a radius of curvature as above derived, containers 24 will remain in contact with the rails and will not rebound. Hence a smooth transfer results.

Although the foregoing invention has been described in some detail by way of illustration and example for purposes of clarity of understanding, it is understood that certain changes and modifications may be practiced within the spirit of the invention and scope of the appended claims.

What is claimed is:

1. A conveyor system for containers comprising a first conveyor, a second conveyor adjacent and substantially parallel to said first conveyor, means for advancing said conveyors, and a guide rail elevated above the surface of said conveyors to shift containers handled by said system from said first conveyor to said second conveyor, said guide rail having a straight stretch adjacent the edge of said first conveyor opposite said second conveyor and a curved stretch intermediate said straight stretch and the edge of said second conveyor nearest said first conveyor, said curved stretch comprising a circular arc having a minimum radius expressed by the formula $$R_c = \frac{[1 + (\tan \alpha)^2]^{3/2} V^2}{386 \mu} - r$$

wherein $R_c$ is said minimum radius, $\alpha$ is the angle between said straight stretch and said conveyors, $r$ is the radius in inches of the containers handled, $V$ is the velocity of said first conveyor in inches per second, and $\mu$ is the coefficient of friction between said container and said first conveyor.

2. A conveyor system for articles being conveyed comprising a first conveyor, a second conveyor adjacent and substantially parallel to said first conveyor, means for advancing said first conveyor, and at least one guide rail against which said articles are forced in the direction of movement of said conveyors, said guide rail having a straight stretch adjacent the outer edge of said first conveyor disposed at an angle to the direction of movement of said first conveyor and a curved stretch tangent to said straight stretch and terminating at the inner edge of said first conveyor, said curved stretch having a radius of curvature imparting a radial acceleration to articles on said first conveyor which at no point is larger than the radial acceleration of the center of said article while said article is moving along said curved stretch.

3. A conveyor system for containers comprising a first conveyor, a second conveyor adjacent and substantially parallel to said first conveyor, means for advancing said conveyors, and a guide rail elevated above the surface of said conveyors to shift containers handled by said system from said first conveyor to said second conveyor, said guide rail having a straight stretch adjacent the edge of said first conveyor opposite said second conveyor and a curved stretch intermediate said straight stretch and the edge of said second conveyor nearest said first conveyor, said curved stretch comprising a circular arc having a minimum radius expressed by the formula $$R_c = \frac{\left[1 + \frac{V_{x0}^2}{V_y^2}\right]^{3/2} V_y^2}{a} - r$$

wherein $R_c$ is said minimum radius, $V_{x0}$ is the component of the velocity of said container perpendicular to the direction of said first conveyor, $V_y$ is the component of the velocity of said container parallel to the direction of said first conveyor, $a$ is the acceleration of said containers in a direction perpendicular to said conveyors, and $r$ is the radius of said containers.

References Cited in the file of this patent

UNITED STATES PATENTS

| | | |
|---|---|---|
| 2,315,880 | Stiles | Apr. 6, 1943 |
| 2,459,264 | Cerruti | Jan. 18, 1949 |